3,346,630
TRIIODINATED BENZOIC ACIDS
Vernon H. Wallingford, Ferguson, Mo., assignor to Mallinckrodt Chemical Works, St. Louis, Mo., a corporation of Missouri
No Drawing. Filed Oct. 7, 1963, Ser. No. 314,535
8 Claims. (Cl. 260—518)

ABSTRACT OF THE DISCLOSURE

The compounds are of the class of N-(carbamylalkyl) amido-2,4,6-triiodobenzoic acids, useful as X-ray contrast agents. Representative is the compound:

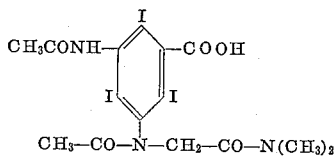

The corresponding 3-amino compounds are intermediates.

Briefly, the present invention is directed to certain N-(carbamylalkyl) amidotriiodobenzoic acids and to certain salts thereof. The invention also includes methods of preparing the novel compounds of the class described.

Among the objects of the invention may be mentioned the provision of new benzoic acid derivatives; the provision of new iodinated compounds; the provision of N-(carbamylalkyl)amidotriiodobenzoic acid derivatices; the provision of compounds of the type indicated which are useful for the preparation of roentgenographic contrast media; the provision of novel compounds which are useful intermediates for the preparation of new benzoic acid derivatives; and the provision of methods of preparing such compounds. Other objects and features will be in part apparent and in part pointed out hereinafter.

The invention accordingly comprises the products and methods hereinafter described, the scope of the invention being indicated in the following claims.

The present invention is directed to the novel N-(carbamylalkyl)amido-2,4,6-triiodobenzoic acids represented by the formula:

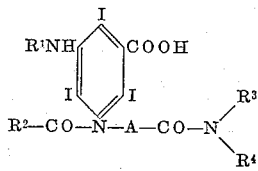

wherein A is a lower alkylene radical, $R^1$ is hydrogen or a lower monocarboxylic acyl radical, $R^2$ is a lower alkyl radical, and $R^3$ and $R^4$ are hydrogen or lower alkyl, and salts thereof.

In the preferred compounds, A is methylene, $R^1$ is acetyl, $R^2$ is methyl and $R^3$ and $R^4$ are hydrogen or methyl radicals. The present invention also includes methods of preparing the novel compounds defined above.

The novel compounds of the present invention, and especially the preferred compounds referred to above, are useful for the preparation of roentgenographic contrast media. For example, concentrated sterile aqueous solutions of salts of nontoxic cations with the acids wherein $R^1$ is an acyl group are of low toxicity and contain a high concentration of organically bound and substantially physiologically inert iodine which can be administered intravascularly. The lower members of the series are excreted primarily through the urinary system. Sodium and N-methylglucamine salts of the compounds of the invention are useful for the preparation of solutions for intravascular injection in connection with vasographic X-ray techniques, such as arteriography and venography. Such solutions are also useful in techniques for visualizing structures of the excretory system.

Dispersions of water insoluble derivatives of these iodinated acids, such as their amides and esters, are also useful, as for example in visualizing hollow organs and cavities having external orifices through which the contrast preparation can be introduced preliminary to the examination and removed after the examination is completed.

The compounds are also useful for the preparation of other types of contrast media, such as for example, nonaqueous dispersions.

The novel amino compounds of the invention may be made by a process which comprises reacting a salt of a 3-amino-5-lower alkanamidotriiodobenzoic acid with a haloamide of the formula $X—A—CO—N—R^3R^4$, wherein X is a halogen, A is a lower alkylene function, and $R^3$ and $R^4$ are selected from the group consisting of hydrogen and lower alkyl functions, to form a compound of the formula:

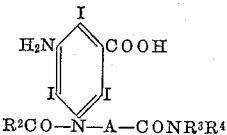

The amino group is then acylated in the conventional manner to form the corresponding alkanamido compound.

The condensation of the 3-amino-5-alkanamido-2,4,6-triiodobenzoic acid with the haloamide is carried out under the general conditions described in the copending coassigned application Ser. No. 75,916 of Vernon H. Wallingford and Robert D. Rands, Jr., filed Dec. 15, 1960. The condensation is carried out in a suitable inert anhydrous solvent, such as ethanol, methanol, or other lower alcohols. Two equivalents (with respect to the substituted benzoic acid starting material) of a metal alcoholate, preferably an alkali metal alcoholate such as sodium ethylate, are added, followed by the haloamide. Condensation occurs at the amido nitrogen yielding a salt of the general formula:

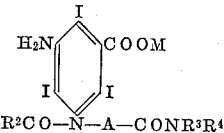

where M is one equivalent of a metal and A, $R^2$, $R^3$ and $R^4$ have the meanings defined above. As an alternative, a salt of the benzoic acid starting material may be used in place of the free acid. Under these circumstances, only one equivalent of the metal alcoholate is used, since the second equivalent, which otherwise is used to neutralize the carboxyl group, is not needed.

In the acylation step, conventional acylating agents such as acid anhydrides or acid chlorides, may be used.

While the 3-alkanamido 5-[(N-carbamylalkyl) alkanamido]-2,4,6-triiodobenzoic acids of the invention are preferably prepared by treating a 5-alkanamido-3-amino-2,4,6-triiodobenzoic acid with a haloamide, followed by acylation of the amino group as previously described, they may also be made using a 3-alkanamido-5-alkanamido-2,4,6-triiodobenzoic acid as a starting material. For example, 3-acetamido-5 - [N - (N - methylcarbamethyl) acetamido]-2,4,6-triiodobenzoic acid may be prepared by treating 3,5-bisacetamido-2,4,6-triiodobenzoic acid with one equivalent of N-methylchloroacetamide and two equivalents of sodium ethylate. However, substitution is not confined to a single acetamido group, the desired 3-acetamido-5 - [N - (N - methylcarbamylmethyl) - acetamido]-2,4,6-triiodobenzoic acid being mixed with substantial proportions of 3,5-bis[N-(methylcarbamylmethyl)-acetamido]-2,4,6-triiodobenzoic acid and unreacted 3,5-bisacetamido-2,4,6-triiodobenzoic acid. This obviously increases the difficulty of isolating the desired monosubstituted derivative in a pure state.

The following examples illustrate the invention.

EXAMPLE 1

*3-amino-5-[N-(N-methylcarbamylmethyl)-acetamido]-2,4,6-triiodobenzoic acid*

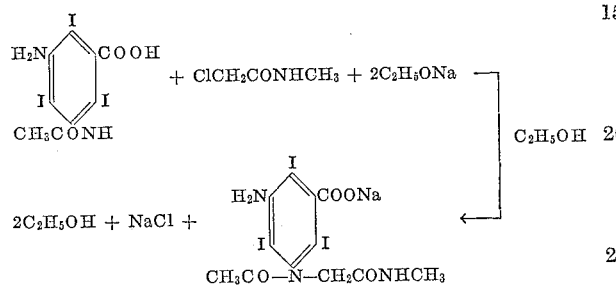

Metallic sodium (4.6 g., 0.2 mole) was dissolved in anhydrous denatured alcohol (100 ml.) (Treasury Department Formula SDA 2B), the resulting solution of sodium ethylate was cooled to 30° C. and 3-amino-5-acetamido-2,4,6-triiodobenzoic acid (57.2 g., 0.1 mole) was added and brought completely into solution during 10 minutes stirring. N-methyl-chloroacetamide (12 g., 0.106 mole) was added and the mixture was stirred and heated to refluxing temperature for one and one-quarter hours. The mixture, no longer alkaline, was heated on a steam bath under an air jet to evaporate the alcohol. Toward the end of the evaporation, water (50 ml.) was added to keep the salts in solution. This residual solution was cooled, and concentrated hydrochloric acid (12 ml.) was added to precipitate a gummy mass. The gum was congealed by gentle warming, then chilled in an ice bath and the aqueous liquor poured off. The treatment of the gum was repeated twice more, leaving a residue of 78.9 g. of crude 3-amino-5-[N - (N - methylcarbamylmethyl) - acetamido]-2,4,6-triiodobenzoic acid. Theoretical yield, 64.3 g. The excess weight was probably due to occluded water.

EXAMPLE 2

*3-acetamido-5-[N-(N-methylcarbamylmethyl)-acetamido]-2,4,6-triiodobenzoic acid*

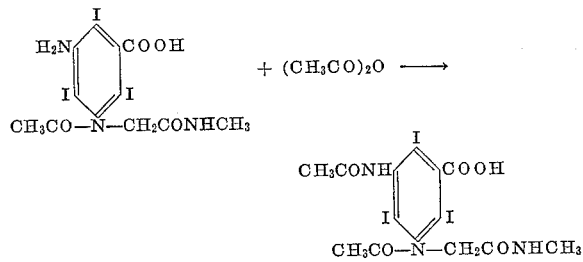

The crude 3-amino-5-[N-(N-methylcarbamylmethyl)-acetamido]-2,4,6-triiodobenzoic acid from Example 1 was dissolved in acetic anhydride (100 ml.) by gently warming. The temperature then rose spontaneously to 90° C. in spite of the use of a cooling ice bath. The mixture was cooled to 60° C. and concentrated sulfuric acid (0.5 ml.) in acetic anhydride (3 ml.) was added. After 45 minutes at 60-70° C., acetylation was complete. Water (10 ml.) was slowly added to decompose the excess acetic anhydride. The mixture was then cooled and poured into ice-cold anhydrous ether (650 ml.). An amorphous solid precipitated and was filtered off and washed with cold ether (100 ml.). The gummy solid was dissolved in anhydrous ethanol (300 ml.) and the solution was treated with decolorizing carbon and filtered. Anhydrous monomethylamine (12.9 g.) was passed into the solution, and after 3 days the crystalline monomethylamine salt of 3-acetamido-5-[N-(N-methylcarbamylmethyl) - acetamido] - 2,4,6 - triiodobenzoic acid was filtered off, washed with alcohol and dried at 120° C. The practically colorless product weighed 47.1 g.

The monomethylamine salt referred to in the previous paragraph was dissolved in water, and an excess of mineral acid was added. A gummy amorphous product separated. This was digested with acetic anhydride to yield the crystalline free acid. A more convenient method of preparing the crystalline acid is described below.

Monomethylamine salt of 3-acetamido-5-[N-(N-methylcarbamylmethyl)-acetamido] - 2,4,6 - triiodobenzoic acid (64 g.) was slurried with acetic anhydride (150 ml.), and the slurry was maintained at 60° C. with frequent stirring for 4 hours. The large crystals of the monomethylamine salt were completely transformed to fine crystals of 3-acetamido - 5 - [N - (N - methylcarbamylmethyl) - acetamido]-2,4,6-triiodobenzoic acid. The mixture was cooled and filtered and the product washed with acetic anhydride and dried at 120° C. for 48 hours. Yield, 56.8 g. The product melted indefinitely at 196–210° C. with decomposition. Calculated for $C_{14}H_{14}I_3N_3O_5$: Neutral equivalent, 684.7; iodine, 55.6%. Found (corrected for 0.5% water) neutral equivalent, 679; iodine, 55.2%. The infrared spectrum was consistent with the indicated structure.

EXAMPLE 3

*3-acetamido-5-[N-(N-methylcarbamylmethyl)-acetamido]-2,4,6-triiodobenzoic acid, sodium salt*

3-acetamido-5-[N-(N-methylcarbamylmethyl) - acetamido]-2,4,6-triiodobenzoic acid was converted to its sodium salt by known methods. The salt is highly soluble in water.

By intravenous administration of a 55.7% (W/V) solution of the sodium salt (300 mg. I/ml.), the acute $LD_{50}$ in mice, was found to be approximately 18,300 mg./kg.

Intravenous administration of a solution of this salt yields good X-ray visualization of the kidneys of the dog.

EXAMPLE 4

*3-amino-5-[N-(N,N-dimethylcarbamylmethyl)-acetamido]-2,4,6-triiodobenzoic acid*

3-amino-5-acetamido - 2,4,6 - triiodobenzoic acid (57.2 g., 0.1 mole) was added to a cool (30° C.) solution of sodium ethylate prepared from metallic sodium (4.6 g.) as described in Example 1. The mixture was stirred 15 minutes to dissolve all the solid, after which N,N-dimethylchloroacetamide (13.0 g., 0.107 mole) was added, and the mixture was refluxed for 1 hour. The reaction mixture was heated on a steam bath under a jet of air to evaporate the alcohol, water (50 ml.) being added toward the end of the evaporation to keep the salt in solution. Concentrated hydrochloric acid (10 ml.) was added, and the mixture was chilled to precipitate a taffy-like gum of crude 3-amino-5-[N-(N,N-dimethplcarbamylmethyl)-acetamido]-2,4,6-triiodobenzoic acid (85.7 g.).

EXAMPLE 5

*3-acetamido-5-[N-(N,N-dimethylcarbamymethyl)-acetamido]-2,4,6-triiodobenzoic acid*

The crude gummy 3-amino-5-[N-(N,N - dimethylcarbamylmethyl)-acetamido]-2,4,6-triiodobenzoic acid from Example 4 was added in portions during 20 minutes to acetic anhydride (100 ml.) containing concentrated sulfuric acid (0.5 ml.), maintained at 65-70° C. After 45 minutes at 65-70° acetylation was complete, and the crude product was precipitated as a gum by pouring the reaction mixture into ice-cold anhydrous ether (650 ml.) The gum was dissolved in water (400 ml.) by the addition of a slight excess of ammonium hydroxide, and the product was reprecipitated by adding concentrated hydrochloric acid (15 ml.). Three hours' digestion and stirring at about 80° C. caused the product to crystallize. It was filtered off, washed with water and dried 2 hours at 120° C. and then 18 hours at room temperature. Yield of 3-acetamido-5-[N - (N,N - dimethylcarbamylmethyl)-acetamido] - 2,4,6 - triiodobenzoic acid, 37.3 g. Melting point, 233.6–235.6° (with decomposition). Water (by Karl Fischer method, 2.6%. Calculated for $$C_{15}H_{16}I_3N_3O_5$$

Neutral equivalent, 698.7; iodine, 54.4%. Found (anhydrous basis): Neutral equivalent, 698; iodine, 54.4%.

EXAMPLE 6

*3-acetamido-5-[N-(N,N-dimethylcarbamylmethyl)-acetamido]-2,4,6-triiodobenzoic acid, solution salt*

3-acetamido-5 - [N - (N,N - dimethylcarbamylmethyl)-acetamido]-2,4,6-triiodobenzoic acid was converted to its sodium salt by known methods. The salt is highly soluble in water.

By intravenous administration of a 56.8% (W/V) solution (300 mg. I/ml.), the acute $LD_{50}$ in mice was found to be approximately 16,000 mg./kg.

Intravenous administration of a solution of the salt yields good X-ray visualization fo the kidneys of the dog.

In view of the above, it will be seen that the several objects of the invention are achieved and other advantageous results obtained.

As various changes could be made in the above products and methods without departing from the scope of the invention, it is intended that all matter contained in the above description shall be interpreted as illustrative and not in a limiting sense.

What is claimed is:
1. 3-amino-5-[N-(N - methylcarbamylmethyl) - acetamido]-2,4,6-triiodobenzoic acid.
2. A compound selected from the group consisting of 3-acetamido-5-[N - (N - methylcarbamylmethyl) - acetamido] - 2,4,6 - triiodobenzoic acid and the sodium and N-methylglucamine salts thereof.
3. 3-acetamido-5-[N-(N-methylcarbamylethyl) - acetamido]-2,4,6-triiodobenzoic acid.
4. 3-acetamido - 5 - [N - (N - methylcarbamylmethyl)-acetamido]-2,4,6-triiodobenzoic acid, sodium salt.
5. 3-amino-5 - [N - (N,N - dimethylcarbamylmethyl)-acetamido]-2,4,6-triiodobenzoic acid.
6. A compound selected from the group consisting of 3-acetamido-5-[N-(N,N-dimethylcarbamylmethyl)- acetamido] - 2,4,6 - triiodobenzoic acid and the sodium and N-methylglucamine salts thereof.
7. 3-acetamido-5-[N-(N,N - dimethylcarbamylmethyl)-acetamido]-2,4,6-triiodobenzoic acid.
8. 3-acetamido-5 - [N - (N,N - dimethylcarbamylmethyl)-acetamido]-2,4,6-triiodobenzoic acid, sodium salt.

References Cited
UNITED STATES PATENTS

| | | | |
|---|---|---|---|
| 2,840,602 | 6/1958 | Larsen | 260—518 |
| 3,048,626 | 8/1962 | Wallingford | 260—518 |

RICHARD K. JACKSON, *Primary Examiner.*

L. THAXTON, *Assistant Examiner.*